United States Patent
Haeberer et al.

(10) Patent No.: US 8,156,734 B2
(45) Date of Patent: Apr. 17, 2012

(54) METHOD FOR OPERATING A REAGENT METERING VALVE AND APPARATUS FOR CARRYING OUT THE METHOD

(75) Inventors: Rainer Haeberer, Bretten (DE); Matthias Horn, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 642 days.

(21) Appl. No.: 12/306,125

(22) PCT Filed: Nov. 8, 2007

(86) PCT No.: PCT/EP2007/062079
§ 371 (c)(1),
(2), (4) Date: Dec. 22, 2008

(87) PCT Pub. No.: WO2008/058896
PCT Pub. Date: May 22, 2008

(65) Prior Publication Data
US 2009/0288395 A1 Nov. 26, 2009

(30) Foreign Application Priority Data
Nov. 14, 2006 (DE) .......................... 10 2006 053 485

(51) Int. Cl.
*F01N 3/00* (2006.01)
(52) U.S. Cl. ............... 60/286; 60/295; 60/297
(58) Field of Classification Search .............. 60/286
See application file for complete search history.

(56) References Cited

U.S. PATENT DOCUMENTS

| | | | | |
|---|---|---|---|---|
| 5,505,165 | A * | 4/1996 | Kimoto | 123/41.12 |
| 6,279,603 | B1 * | 8/2001 | Czarnik et al. | 137/339 |
| 2006/0075992 | A1 * | 4/2006 | Akita et al. | 123/431 |
| 2009/0007545 | A1 | 1/2009 | Kameda | |

FOREIGN PATENT DOCUMENTS

| | | |
|---|---|---|
| DE | 44 36 397 | 4/1996 |
| DE | 199 03 439 | 8/2000 |
| DE | 103 22 155 | 1/2004 |
| DE | 10322155 A1 * | 1/2004 |
| DE | 10 2004 031 626 | 2/2006 |
| EP | 1 024 254 | 8/2000 |
| JP | 2003-328744 | 11/2003 |
| JP | 2006-291821 | 10/2006 |

OTHER PUBLICATIONS

Translation of DE 10322155 A1.*

* cited by examiner

*Primary Examiner* — Thomas Denion
*Assistant Examiner* — Jason Shanske
(74) *Attorney, Agent, or Firm* — Merchant & Gould P.C

(57) ABSTRACT

The invention relates to a method for operating a metering valve arranged in an exhaust gas region of an internal combustion engine for metering a reagent or a precursor of a reagent, comprising a cooling device to prevent excess temperatures. The invention further relates to a device for carrying out the method. During metering breaks of the regular metering process, a targeted predetermined minimum amount is metered for the cooling of the metering valve, if required.

11 Claims, 1 Drawing Sheet

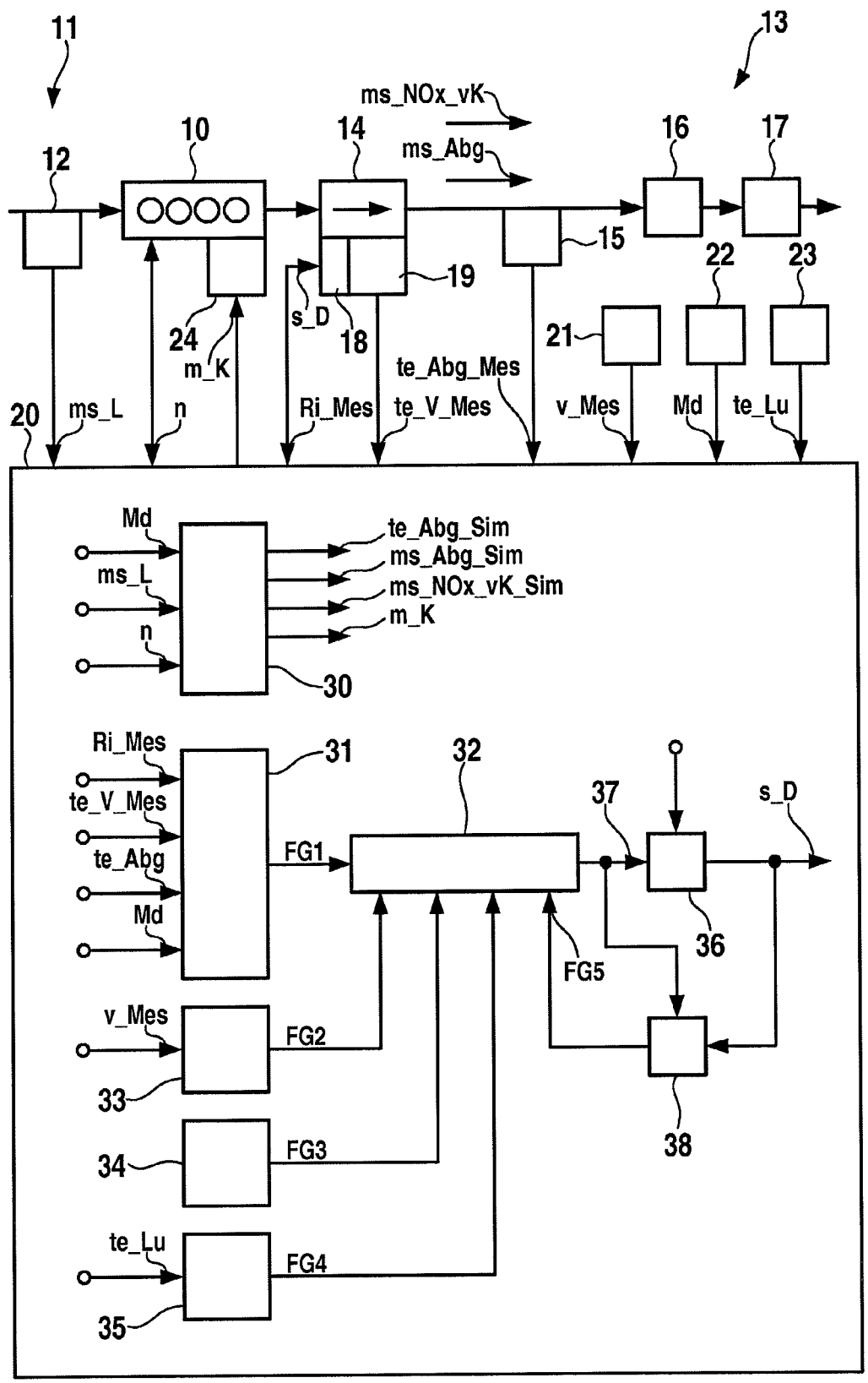

METHOD FOR OPERATING A REAGENT METERING VALVE AND APPARATUS FOR CARRYING OUT THE METHOD

TECHNICAL FIELD

The invention is based on a method for operating a reagent metering valve and on a device for implementing the method according to the category of independent claims.

Subject of the present invention are also a control unit program as well as a control unit program product.

BACKGROUND

DE 199 03 439 A1 describes a procedure for operating an internal combustion engine, in whose exhaust gas area a SCR-catalyst (selective-catalytic-reduction) is arranged, which reduces the nitrous gases that are contained in the exhaust gas of the combustion engine with a reagent into nitrogen. The metering of the reagent or a precursor of the reagent preferably takes place depending on operating parameters of the combustion engine, as for example the engine speed and the injected fuel amount. Moreover the metering takes place depending on exhaust gas parameters, as for example the exhaust gas temperature or the operating temperature of the SCR-catalyst. The reducing agent ammoniac is for example provided as the reagent, which can be won form a urea/water solution. The metering of the reagent or reactants of the reagent has to be determined carefully. A metering that is too low causes that nitrous gases cannot be completely reduced anymore in the SCR-catalyst. A metering that is too high causes a reagent slip, which can cause an unnecessary high reagent consumption on the one hand and, depending on the kind of reagent, an unpleasant odor nuisance on the other hand.

The determination of the nominal flow or the metering amount can take place according to EP 1 024 254 A2 based on an operating parameter of the combustion engine like the fuel injection amount and/or the engine speed and at least on parameter of the exhaust gas if necessary, as for example the exhaust gas temperature.

DE 10 2004 031 626 A1 describes a method for operating a SCR-catalyst that is used for purifying the exhaust gas of an internal combustion engine, which provides a control or regulation of the reagent filling level in the SCR-catalyst on to a preset storage nominal value. The targeted default of the storage nominal value ensures on the one hand that a sufficient reagent amount is provided in unsteady states of the combustion engine for an almost complete elimination of the NOx raw emissions of the combustion engine and on the other hand that a reagent slip is avoided. The reagent filling level of the SCR-catalyst is determined with the aid of a catalyst model, which considers the NOx mass flow that flows into the SCR-catalyst, the NOx mass flow that leaves the SCR-catalyst, the catalyst temperature and if necessary the reagent slip. The maximally possible reagent filling level of the SCR-catalyst especially depends on the operating temperature of the SCR-catalyst, which is the highest at lower operating temperatures and drops to lower values with increasing operating temperatures. The efficiency of the SCR-catalyst depends on the catalytic activity, which is low at low operating temperatures, passes a maximum with an increasing operating temperature and drops again with a more increasing operating temperature.

The reagent or the precursor of the reagent is metered with a metering valve, which for example can be arranged at an exhaust gas channel of the combustion engine. For purposes of the mechanical reliance of the metering valve and with regard to an expedited ageing process of the reagent accompanied by a possible corrosion affinity a cooling of the metering valve can be provided. Such a cooling is described in DE 44 36 397 A1, which provides a cooling jacket that is incorporated into the cooling water circuit of a combustion engine and that surrounds the metering valve.

The invention is based on the task to realize a possibly necessary cooling of a metering valve by simple means.

SUMMARY

The invention's approach with the characteristics of the independent method provides the advantage that the cooling of the metering valve is undertaken with existing means, so that no additional costs incur. Advantages arise hereby especially in the series production of an arrangement, in which the method according to the invention takes place.

The approach according to the invention realizes a component protection cost-effectively. In particular it is prevented that the reagent or the precursor of the reagent that has to be metered is exposed to high temperatures.

The procedure according to the invention is based on the regular metering of the reagent. In metering breaks, in which no reagent is metered, and during a simultaneously present high temperature of the metering valve a targeted preset minimum amount is metered. The minimum amount is determined in such a way that even at a maximum reagent filling level in the catalyst and therefore an overdosing no meaningful reagent slip occurs. The minimum amount is determined in the scope of an application and correspondingly preset. It has been experimentally determined by a certain SCR-catalyst that this is the case at a minimum amount, which is smaller than 10% of the maximum metering amount, whereby still a sufficient cooling effect is achieved.

Advantageous improvements and embodiments of the invention's procedure result from dependent claims.

Different embodiments provide that the minimum amount is only metered under certain conditions in metering breaks of the regular metering. A first embodiment provides that the minimum amount is only metered when a regeneration of a storage catalyst and/or a particle filter takes place. An additional or alternative embodiment provides that the minimum amount is only metered when the motor vehicle, in which the combustion engine is used as drive motor, falls below a minimum speed. An additional or alternative embodiment provides that the minimum amount is only metered when a measure for the metering valve temperature exceeds a metering valve temperature threshold value. The individual embodiments can linked in each case by an 'or' and partially also by an 'and'. By considering at least one of the embodiments an unnecessary metering of the minimum amount is avoided.

One embodiment provides that the measure for the metering valve temperature is determined depending on at least one operating parameter of the combustion engine and/or a parameter of the exhaust gas.

Alternatively or additionally it can be provided that the measure for the metering valve temperature is determined depending on a temperature signal, which is provided by a temperature sensor that is arranged in the exhaust gas area.

Furthermore it can be alternatively or additionally provided that the measure for the metering valve temperature is determined depending on a detected internal resistance of the metering valve that is realized as a magnet valve.

The individual embodiments regarding the determination of the measure for the metering valve temperature allow a consideration of the actual temperature conditions at least in the area of the metering valve, whereby an unnecessary metering of the minimum amount can be prevented.

According to an advantageous determination it is provided that the minimum amount is limited to an amount, which is smaller than 10% of the maximum metering amount. The limitation of the minimum amount on to the given minimum value ensures that no dinitrogen monoxide (laughing gas) develops even at higher operating temperatures in the exhaust gas area, in particular in the SCR-catalyst, which requires the reagent especially for converting a NOx emission of the combustion engine.

The device according to the invention for implementing the procedure concerns at first a control unit, which is customized for implementing the method.

The control unit preferably comprises at least one electrical storage, in which the procedure steps are saved as control unit program.

The control unit program according to the invention provides that all steps of the invention's procedure are implemented, when it runs in a control unit.

The control unit program product according to the invention with a program code that is saved on a machine readable memory implements the procedure according to the invention, when the program is carried out in a control unit.

Further advantageous improvements and embodiments of the procedure according to the invention arise from the following description.

BRIEF DESCRIPTION OF THE DRAWINGS

FIG. 1 shows a technical environment, in which a procedure according to the invention runs.

DETAILED DESCRIPTION

FIG. 1 shows a combustion engine 10, in whose intake area 11 an air detection 12 and in whose exhaust gas area 13 a metering device 14, an exhaust gas temperature sensor 15, a catalyst 16 and a particle filter 17 are arranged.

An exhaust gas mass flow ms_abg occurs in the exhaust gas area and upstream before the catalyst 16 a NOx mass flow ms_NOx_vK occurs.

The metering device 14 contains a magnet valve 18 as well as a metering valve temperature sensor 19.

The air detection 12 supplies an air signal ms_L to the control unit 20, a rotary signal n to the combustion engine 10 and a measured exhaust gas temperature te_abg_Mes to the exhaust gas temperature sensor 15.

The magnet valve 18 supplies the control unit 20 with an internal coil resistance Ri_Mes and the metering valve temperature sensor 19 with a measured metering valve temperature te_V_Mes.

Furthermore a speed sensor 21, an accelerator pedal 22 and an ambient air temperature sensor 23 are provided as sensors, whereby the speed sensor 21 supplies the control unit 20 with a measured driving speed v_Mes, the accelerator pedal 22 with a load Md and the ambient air temperature sensor with the ambient air temperature te_Lu.

The control unit 20 supplies a fuel metering device 24 with a fuel signal m_K and the magnet valve 18 with a metering signal s_D.

The control unit 20 contains a parameter detection 30, which is provided with the load Md, the air signal ms_L as well as the rotary signal n and which provides the fuel signal m_K, a calculated exhaust gas temperature te_Abg_Sim, a calculated exhaust gas mass flow ms_Abg_Sim as well as a calculated NOx mass flow ms_NOx_vK_Sim.

The control unit 20 furthermore contains a cooling demand detection 31, which is provided with the internal coil resistance Ri_Mes, the measured metering valve temperature te_V_Mes, the exhaust gas temperature te_Abg as well as the load Md and which provides a first enabling signal FG1, which is provided to the selection logic 32.

The control unit 20 furthermore contains a speed comparator 33, which compares the driving speed v_Mes with a not further shown driving speed threshold value and which provides a second enabling signal FG2 to the selection logic 32 depending on the comparison result.

Moreover the control unit 20 comprises a regeneration control 34, which supplies a third enabling signal FG3 to the selection logic 32.

A temperature comparator 35 is furthermore provided, which compares the ambient air temperature te_Lu with a not further mentioned ambient air temperature threshold value and which provides a fourth enabling signal FG4 to the selection logic 32 depending on the comparison result.

The selection logic 32 provides a cooling signal 37 to the metering signal detection 36, which itself provides the metering signal s_D for actuating the metering valve 18. The metering signal s_D is supplied to an enabling signal detection 38, which provides a fifth enabling signal FG5. The enabling signal detection 38 is furthermore supplied with the cooling signal 37.

According to the invention it is proceeded as follows:

As a protection against an over-temperature of the metering valve 18 a cooling of the metering valve 18 is thereby provided, in that a targeted preset minimum amount for cooling the metering valve 18 is metered in metering breaks of the regular metering, if necessary. It is necessary when at least one measure for the temperature of the metering valve 18 exceeds a default temperature threshold value. Hereby the minimum amount is to be set to a value, which is one the one hand sufficient to achieve the desired cooling effect. On the other hand it has to be made sure that a reagent slip at the end of the exhaust gas area 13 is avoided at most or at least minimized. Such a reagent slip could occur if a SCR-catalyst is used as catalyst, whose reagent filling level already provides the maximum filling level at a cooling demand. With the aid of experiments it could have been shown that at a minimum amount, which is smaller than for example 10% of the maximum metering amount, a sufficient high cooling effect can be achieved on the one hand and a meaningful reagent slip is nevertheless not to be realized on the other hand.

First it has to be made sure that the metering signal determination 36 does not determine the metering signal s_D depending on not further mentioned input signals in the scope of the regular metering operation onto a specific value as for example depending on the upstream NOx mass flow ms_NOx_vK or depending on the calculated upstream NOx mass flow ms_NOx_vK_Sim.

Therefore the enabling signal detection 38 is provided, which controls the occurrence of a metering signal s_D depending on a present cooling signal 37. If the metering signal s_D is present without a cooling signal, the fifth enabling signal FG5 will disable the selection logic 32, so that the selection logic 32 represses a cooling signal 37 that might have to be released. Nevertheless a metering of the reagent or a precursor of the reagent takes place.

The reagent can for example be ammoniac, which works as reducing agent in a SCR-catalyst 16. The ammoniac can for example be won from a urea/water solution that has to be metered as a precursor of the reagent. Furthermore the reagent can for example be an oxidizable material like hydrocarbons, which reacts on a catalytic layer either in the catalyst 16 or in the particle filter 17 exothermically for heating the exhaust gas or the catalyst 16 and/or the particle filter 17.

The cooling signal 37 can impinge the metering signal determination 36 due to the fifth enabling signal FG5 only for providing a metering signal s_D that corresponds with the minimum amount, when a metering break takes place in the scope of the regular metering.

The cooling demand detection 31 determines the first enabling signal FG1 depending on the internal coil resistance Ri_Mes of the magnet valve 18 and/or the metering valve temperature te_V_Mes that has been measured by the metering valve temperature sensor 19 and/or the exhaust gas temperature te_Abg and/or the load Md.

The exhaust gas temperature te_Abg can be measured by the exhaust gas temperature sensor 15, which provides the measured exhaust gas temperature te_Abg_Mes. The exhaust gas temperature sensor 15 can be omitted if the exhaust gas temperature te_Abg_Sim that has been calculated by the parameter detection 30 is used at least as a measure for the exhaust gas temperature te_Abg.

The accelerator pedal 22 is preferably arranged in a not further shown motor vehicle, whereby the accelerator pedal position mirrors the load Md of the combustion engine 10 at least approximately.

The mentioned input parameters of the cooling demand determination 31 mirror individually or in a random combination at least a measure for the temperature in the area of the metering device 14 or the metering valve 18. By a comparison with a temperature threshold value, which the metering valve 18 should not exceed, it is decided, whether the first enabling signal FG1 is provided. If the temperature threshold value is exceeded, the first enabling signal FG1 causes the selection logic 32 to provide the cooling signal 37, which further causes the metering signal determination 36 to provided the metering signal s_D that corresponds with the minimum amount for cooling the metering valve 18.

The second enabling signal FG2, which is provided by the speed comparator 33 depending on the driving speed v_Mes of the motor vehicle, can be used in order to allow the output of the cooling signal 37 only at driving speeds, which are below a driving speed threshold. If higher driving speeds are present it can be assumed that the air stream can contribute to a sufficient cooling of the metering valve 18.

The third enabling signal FG3, which provides the regeneration control 34, can be used to allow the output of the cooling signal only if a regeneration of a catalyst 16 that is realized as a storage catalyst and/or of a particle filter 17 takes place, since the regeneration is generally associated with very increased operating temperature of the catalyst 16 or the particle filter 17, which can also have an effect on the metering valve 18 depending on the structural conditions.

The fourth enabling signal FG4, which is provided by the temperature comparator 35 depending on the ambient air temperature te_Lu that is measured by the ambient air temperature sensor 23, can also be used to release the cooling signal 37 only if the ambient air temperature exceeds a default threshold. If this is not the case it can be assumed that the cool ambient air is already enough in order to provide the required cooling effect for the metering valve 18.

The first to fourth enabling signal FG1, FG2, FG3, FG4 can be considered individually or also in combination in the selection logic 32. It can be provided for example that the first enabling signal FG1 only causes the release of the cooling signal 37, if simultaneously the second enabling signal FG2 signalizes a low driving speed, the third enabling signal FG3 signalizes a happening regeneration and the fourth enabling signal FG4 signalizes a high air temperature. Useful sub-combinations can also be considered in the selection logic 32. In the extreme case already one single enabling signal FG1, FG2, FG3, FG4 can be used to provide or repress the cooling signal 37.

The invention claimed is:

1. A method of operating a metering valve arranged in an exhaust gas area of an internal combustion engine, the metering valve used for metering a reagent or a precursor of a reagent and being cooled to prevent an excess temperature, the method comprising:

metering a targeted predetermined minimum amount of a reagent or a precursor of a reagent during a metering break of a regular metering process for cooling of the metering valve, wherein the metering of the targeted predetermined minimum amount is conducted when a speed of a motor vehicle having the internal combustion engine as drive motor falls below a minimum speed.

2. The method of claim 1, further comprising only metering the minimum amount when a regeneration of one of: a storage catalyst; and a particle filter occurs.

3. The method of claim 1, further comprising only metering the minimum amount when an ambient temperature exceeds an ambient temperature threshold value.

4. The method of claim 1, further comprising only metering the minimum amount when a measure for a metering valve temperature exceeds a metering valve temperature threshold value.

5. The method of claim 4, further comprising determining the measure for the metering valve temperature depending on at least one of: at least one operating parameter of the internal combustion engine; and a parameter of the exhaust gas.

6. The method of claim 4, further comprising using a measured metering valve temperature as the measure for the metering valve temperature.

7. The method of claim 4, further comprising determining the measure for the metering valve temperature depending on an internal coil resistance of the metering valve, wherein the metering valve is realized as a magnet valve.

8. The method of claim 1, further comprising setting the minimum amount to an amount less than 10% of a maximum metering amount that can be adjusted during the metering operation.

9. A device to implement a method of operating a metering valve arranged in an exhaust gas area of an internal combustion engine, the metering valve used for metering a reagent or a precursor of a reagent and being cooled to prevent an excess temperature, the method comprising: metering a targeted predetermined minimum amount of a reagent or a precursor of a reagent during a metering break of a regular metering process for cooling of the metering valve, wherein the metering of the targeted predetermined minimum amount is conducted when a speed of a motor vehicle having the internal combustion engine as drive motor falls below a minimum speed.

10. A computer-implemented method for operating a metering valve arranged in an exhaust gas area of an internal combustion engine, the metering valve used for metering a reagent or a precursor of a reagent and being cooled to prevent an excess temperature, the computer-implemented method comprising: metering a targeted predetermined minimum amount of a reagent or a precursor of a reagent during a metering break of a regular metering process for cooling of the metering valve, wherein the metering of the targeted predetermined minimum amount is conducted when a speed of a motor vehicle having the internal combustion engine as drive motor falls below a minimum speed.

11. A computer program product with a program code saved on a machine readable device and executed on a control unit for operating a metering valve arranged in an exhaust gas area of an internal combustion engine, the metering valve used for metering a reagent or a precursor of a reagent and being cooled to prevent an excess temperature, the program code including instructions for metering a targeted predetermined minimum amount of a reagent or a precursor of a reagent during a metering break of a regular metering process for cooling of the metering valve, wherein the metering of the targeted predetermined minimum amount is conducted when a speed of a motor vehicle having the internal combustion engine as drive motor falls below a minimum speed.

* * * * *